(12) United States Patent
Schleicher et al.

(10) Patent No.: US 6,590,095 B1
(45) Date of Patent: Jul. 8, 2003

(54) METHOD OF PREPARING A CELLULOSE CARBAMATE SOLUTION

(75) Inventors: Harry Schleicher, Teltow (DE); Bodo Borrmeister, Potsdam (DE); Hermann Lang, Teltow (DE)

(73) Assignee: Zimmer A.G., Frankfurt am Main (DE)

( * ) Notice: Subject to any disclaimer, the term of this patent is extended or adjusted under 35 U.S.C. 154(b) by 360 days.

(21) Appl. No.: 09/204,609

(22) Filed: Dec. 2, 1998

(30) Foreign Application Priority Data

Dec. 24, 1997 (DE) .......................................... 197 57 958

(51) Int. Cl.$^7$ .............................. C08B 3/00; C07H 1/00
(52) U.S. Cl. ............................ 536/30; 536/56; 536/124
(58) Field of Search ............................ 536/30, 124, 56

(56) References Cited

U.S. PATENT DOCUMENTS

| 4,526,620 | A | 7/1985 | Selin et al. | 536/30 |
| 4,530,999 | A | 7/1985 | Selin et al. | 536/30 |
| 4,639,514 | A | 1/1987 | Turunen et al. | 536/30 |
| 4,639,515 | A | 1/1987 | Turnen et al. | 536/30 |

OTHER PUBLICATIONS

Turunen et al. *Lenzinger Berichte*. 59, 111–117 (1985).

*Primary Examiner*—James O. Wilson
*Assistant Examiner*—Everett White
(74) *Attorney, Agent, or Firm*—McDonnell Boehnen Hulbert & Berghoff

(57) ABSTRACT

The present invention concerns a method of preparing a cellulose carbamate solution by dissolving cellulose carbamate in sodium hydroxide solution at temperatures of <10° C., wherein an 8% to 15% cellulose carbamate solution with a sodium hydroxide concentration of 7% to 12% is prepared in a first step, and then the solution is adjusted to a sodium hydroxide concentration of <9% by diluting with dilute sodium hydroxide solution and/or water in a second step, with the provision that the weight ratio of cellulose carbamate to sodium hydroxide in both steps is >1.

7 Claims, No Drawings

METHOD OF PREPARING A CELLULOSE CARBAMATE SOLUTION

BACKGROUND OF THE INVENTION

1. Field of the Invention

This invention concerns a method of preparing a cellulose carbamate spinning solution by dissolving cellulose carbamate in sodium hydroxide solution, where the solution is prepared by a controlled two-step process.

2. Summary of the Related Art

Cellulose carbamate solutions are needed to prepare regenerated cellulose fibers and other structures. Regenerated cellulose fibers are produced in several steps. The first step consists of reacting cellulose with urea at elevated temperatures to form cellulose carbamate. The cellulose carbamate prepared in this way is then dissolved in sodium hydroxide solution and the resulting solution spun. The cellulose carbamate that is in the form of fibers or other structures can be broken down to cellulose by another process step.

Preparation of the cellulose carbamate solution plays an important role in the process described above. It is known from the literature that cellulose carbamate solutions can coagulate relatively easily and quickly and are more sensitive in this regard than viscose and must be taken into account in designing the spinning operation. The cellulose carbamate solution's quality and stability, which are important for the processing operation and for the quality of the fibers and other structures, depend on the quality and the average degree of polymerization (DP) of the cellulose carbamate and the conditions of preparation of the solution (e.g., the sodium hydroxide concentration, the dissolving temperature, the shearing forces in effect in dissolving, plus any zincate or urea additives in the solution).

Thus, for example, it is known from German Patent No. 3,343,156 that the dissolubility can be influenced by adding urea as a solubilizer. Zincate is another solubilizer (O. T. Turunen et al., *Lenzinger Berichte* 59, 111–177 (1985)). The DP of cellulose carbamate may be adjusted by exposure to high energy radiation prior to or during dissolution of, for example, 5.4 wt. % cellulose carbamate in 10 or 20 wt. % sodium hydroxide at −5° C. (German Patent Application 34 39 714). It is also known that the weight ratio of cellulose carbamate to sodium hydroxide should usually be selected to be <1 for the cellulose carbamate solution, for example, 6.8 wt. % cellulose carbamate in 9 wt. % sodium hydroxide, wherein the sodium hydroxide may be recycled from the further spinning process and its concentration adjusted prior to the dissolving step by addition or evaporation of water (German Patent Applications 35 34 357 and 35 34 371 corresponding to U.S. Pat. Nos. 4,639,514 and 4,639,515).

To make fiber production economical, however, it is necessary to process spinning solutions having the highest possible cellulose carbamate content and the lowest possible sodium hydroxide content, as is conventional for the viscose process. At the same time, the undissolved particle content in these solutions should be minimal. However, better dissolution of the cellulose carbamate and better solution quality obtained by employing a high sodium hydroxide concentration and/or additional additives to the dissolving bath are not consistent with these economic requirements.

SUMMARY OF THE INVENTION

The present invention provides a method of preparing cellulose carbamate solutions that enables preparation of acceptable cellulose carbamate spinning solutions without any other additives, and the ratio of cellulose carbamate concentration to sodium hydroxide concentration is >1. The cellulose carbamate solutions of the invention do not have any premature coagulation either.

The process comprises dissolving cellulose carbamate in an sodium hydroxide solution at temperatures below about 10° C. following by dilution of the resulting solution with additional sodium hydroxide solution and/or water. It has been unexpectedly found that this process obviates the aforementioned disadvantages inherent in the prior art processes.

The foregoing merely summarizes the present invention and is not intended nor should it be construed as limiting the invention in any manner.

DETAILED DESCRIPTION OF THE PREFERRED EMBODIMENTS

The present invention provides for the first time a two-step process for preparing a cellulose carbamate solution. In the first step, an 8–15% cellulose carbamate solution is prepared with a concentration of sodium hydroxide solution of about 7–12% (which is higher than in the second step). It is preferable for the cellulose carbamate concentration to be in the range of 9–12% and the sodium hydroxide concentration to be in the range of 8–10% (all % by weight).

Subsequently, this solution is diluted by adding a dilute sodium hydroxide solution and/or water so that the final sodium hydroxide concentration in the cellulose carbamate solution is less than 9% (preferably $\leq 8\%$). The cellulose carbamate concentration may be in the range of approximately 6–9%. The weight ratio of cellulose carbamate to alkali should be >1 in both steps, i.e., the concentration of the cellulose carbamate solution is higher than that of the sodium hydroxide solution.

More specifically, the invention provides a process for preparing a cellulose carbamate solution, the process comprising a) preparing an 8% to 15% cellulose carbamate solution with a sodium hydroxide concentration of 7% to 12% by dissolving cellulose carbamate in a sodium hydroxide solution at a temperature of <10° C., and b) adjusting the sodium hydroxide concentration of the cellulose carbamate solution to <9% by adding to the cellulose carbamate solution either
   i) a single diluent comprising a dilute sodium hydroxide solution or water, or
   ii) a first diluent followed by a second diluent, wherein if the first diluent is one of water or a dilute sodium hydroxide solution and the second diluent is the other of water or a dilute sodium hydroxide solution, provided that the weight ratio of cellulose carbamate to sodium hydroxide in both (a) and (b) is $\geq 1$.

A cellulose carbamate solution with such a high cellulose carbamate content relative to the sodium hydroxide content at a sodium hydroxide concentration of <9% was previously unknown. It should be noted in particular that the improved dissolubility with the present method is independent of the DP of the cellulose carbamate used. The two-step process yields much better results in all cases with a cuprammonium DP of 200–400 as compared to the one-step prior art method (see Comparative Example).

Dilution from the first step to the second is performed with a sodium hydroxide solution diluent with a concentration of at least 2 percentage points less than in the first step, preferably with a concentration sodium hydroxide of $\leq 4\%$.

As an alternative to this, it is also possible to initially use a diluted sodium hydroxide solution with a concentration of about 2 percentage points less than in the first step as the diluent and then to add water until reaching the desired final concentration. With the present method it is also advantageous to use vigorous stirring during the two-step dissolving process. Preferably, the forced circulation and the shearing forces should be as high as possible, but at the same time the heat development as low as possible. It has also proven advantageous if the diluent is added more slowly at the start of dilution in relation to the end point of dilution. Thus, in this case, the rate of addition of diluent is increased until ultimately the sodium hydroxide solution can be replaced by water. When the diluent is added very slowly and mixed thoroughly, it is also possible to use water as the diluent from the very beginning. The diluent can be added more quickly the higher its sodium hydroxide concentration is. Preferably the diluent is added in such a way that at no time does the dissolved cellulose carbamate precipitate.

Instead of pure solutions of sodium hydroxide in water, technical or recycled sodium hydroxide solutions or sodium hydroxide solutions containing additives like urea or zincate may be used.

In both steps, the dissolving process is carried out at temperatures of <10° C., preferably <5° C.

It has surprisingly been found that the cellulose carbamate solution does not coagulate in the present method (see also Table 1).

The present invention is explained in greater detail below on the basis of several examples. These examples are provided for illustrative purposes and are not intended to limit the invention in any manner. Those skilled in the art will appreciate that modifications and variations on the following can be made without exceeding the spirit or scope of the present invention.

EXAMPLES

Example 1 is a comparative example in which a prior art process (i.e., a one-step process) is carried out for the preparation of cellulose carbamate solution.

Example 1

Preparation of Cellulose Carbamate Solution by Traditional One Step Method

A quantity of cellulose carbamate (DP 239) corresponding to 390 g absolute dry weight with a nitrogen content of 3.2% previously moistened with a 1.8-fold quantity by weight of water and pre-cooled was mixed with 4108 g pre-cooled 10.13% sodium hydroxide solution in a dissolver and dissolved for two hours at 2° C. under intense shearing action and forced circulation, yielding 5200 g cellulose carbamate solution with a cellulose carbamate content of 7.5% and an alkali content of 8%. After diluting the cellulose carbamate solution, a conductometric particle count was performed to characterize the quality of the solution. The particle counts thus determined are listed in the table, infra.

Example 2

Preparation of Cellulose Carbamate Solution by Two Step Method: Addition of 4% NaOH A quantity of cellulose carbamate (DP 239) corresponding to 468 g absolute dry substance with a nitrogen content of 3.2%, which had previously been moistened with a 1.8-fold quantity of water and pre-cooled, was mixed with 3890 g pre-cooled 10.7% sodium hydroxide solution and dissolved for thirty minutes at 2° C. in the same dissolver as in Example 1 to form 5200 g cellulose carbamate solution with a cellulose carbamate content of 9% and an alkali content of 8%. Within the next 30 minutes, 1040 g 4% sodium hydroxide solution was added to the solution in the running dissolver with the cooling system turned on. Then the dissolving process was continued for another hour. The particle content listed in the table (infra) was determined according to Example 1 on the resulting solution with 7.5% cellulose carbamate and 7.3% sodium hydroxide.

Example 3

Preparation of Cellulose Carbamate Solution by Two Step Method: Addition of Water A quantity of cellulose carbamate (DP 239) corresponding to 587.6 g absolute dry substance, with a nitrogen content of 3.2%, which was previously moistened with a 1.8-fold quantity of water and pre-cooled, was mixed with 3555 g pre-cooled 13.2% sodium hydroxide solution and dissolved at 2° C. for 30 minutes to yield 5200 g cellulose carbamate solution with a cellulose carbamate content of 11.3% and a sodium hydroxide content of 9%. Within the next hour, 2700 g water was added to the solution in the running dissolver with the cooling system turned on, and then the dissolving process was continued for one hour more. The particle content listed in the table below was determined on the resulting solution with a cellulose carbamate content of 7.4% and a sodium hydroxide content of 5.9%, following the method according to Example 1.

Example 4

Preparation of Cellulose Carbamate Solution by Two Step Method: Addition of 3% NaOH A quantity of cellulose carbamate (DP 239) corresponding to 598 g absolutely dry substance with a nitrogen content of 3.2%, which had previously been moistened with a 1.8-fold quantity of water and pre-cooled, was mixed with 3526 g pre-cooled 14% sodium hydroxide solution and dissolved at 2° C. for 30 minutes to yield 5200 g cellulose carbamate solution with a cellulose carbamate content of 11.5% and a sodium hydroxide content of 9.5%. Within the next 30 minutes, 1800 g 3% sodium hydroxide solution was added to the solution with the dissolver running and the cooling system turned on. Then the dissolving process was continued for another hour. The particle count list in the table was determined on the resulting solution according to Example 1 with an 8.5% cellulose carbamate content and a 7.8% sodium hydroxide content.

|  | Particle diameter | | | |
| --- | --- | --- | --- | --- |
|  | >5 $\mu$m | >10 $\mu$m | >20 $\mu$m | >30 $\mu$m |
| Example | Particle count/mg cellulose | | | |
| 1 | 565823 | 77177 | 3561 | 331 |
| 2 | 419528 | 42613 | 2145 | 358 |
| 3 | 54537 | 4121 | 210 | 30 |
| 4 | 927 | 224 | 39 | 11 |

We claim:

1. A process for preparing a cellulose carbamate solution, the process comprising a) preparing an 8% to 15% cellulose carbamate solution with a sodium hydroxide concentration of 7% to 12% by dissolving cellulose carbamate in a sodium hydroxide solution at a temperature of less than 10° C., and b) adjusting the sodium hydroxide concentration of the cellulose carbamate solution to a concentration that is less than the concentration in a) and less than 9% by adding to the cellulose carbamate solution either i) a single diluent comprising a dilute sodium hydroxide solution or water, or ii) a first diluent followed by a second diluent, wherein one of said diluents is water and the other is a dilute sodium hydroxide solution, provided that the weight ratio of cellulose carbamate to sodium hydroxide in both (a) and (b) is greater than 1.

2. The process according to 1, wherein in (a) the cellulose carbamate solution contains 9% to 12% cellulose carbamate with a sodium hydroxide concentration of 8% to 10%, which in (b) is adjusted to at most 8% sodium hydroxide.

3. The process according to claim 1, wherein the single diluent in (b) is a sodium hydroxide solution having a concentration of at most 4%.

4. The process according to claim 1, wherein the temperature in (a) and (b) is kept below 5° C.

5. The process according to claim 1, wherein the dissolving in (a) and the addition of the single diluent or the first and second diluents in (b) are performed with stirring.

6. The process according to claim 1, wherein in (b) the first diluent is a sodium hydroxide solution with a concentration of at most 4% and the second diluent is water.

7. The process according to claim 6, wherein the single diluent or the first and second diluents are added more slowly at the start of the dilution than at the end.

* * * * *